(12) United States Patent
Mehra et al.

(10) Patent No.: US 8,776,523 B2
(45) Date of Patent: Jul. 15, 2014

(54) STEAM-DRIVEN POWER PLANT

(75) Inventors: Mahendra Singh Mehra, Alwar (IN);
Nachiket Chilhatey, Karnataka (IN);
Nestor Hernandez Sanchez,
Schenectady, NY (US)

(73) Assignee: General Electric Company,
Schenectady, NY (US)

( * ) Notice: Subject to any disclaimer, the term of this patent is extended or adjusted under 35 U.S.C. 154(b) by 777 days.

(21) Appl. No.: 12/957,526

(22) Filed: Dec. 1, 2010

(65) Prior Publication Data

US 2012/0137685 A1 Jun. 7, 2012

(51) Int. Cl.
| | |
|---|---|
| *F01K 13/00* | (2006.01) |
| *F01K 17/00* | (2006.01) |
| *F01K 3/00* | (2006.01) |
| *F01K 7/06* | (2006.01) |
| *F01K 7/22* | (2006.01) |
| *F01K 7/20* | (2006.01) |
| *F01K 23/10* | (2006.01) |

(52) U.S. Cl.
CPC ............... *F01K 23/10* (2013.01); *Y02E 20/16* (2013.01); *F01K 7/20* (2013.01)
USPC ............ 60/677; 60/652; 60/662; 60/663

(58) Field of Classification Search
USPC .................................................. 60/645–681
See application file for complete search history.

(56) References Cited

U.S. PATENT DOCUMENTS

| | | | | |
|---|---|---|---|---|
| 4,976,100 | A | * | 12/1990 | Lee .................................. 60/772 |
| 5,464,318 | A | * | 11/1995 | Eklund et al. .................... 415/28 |
| 6,062,017 | A | * | 5/2000 | Liebig ......................... 60/39.182 |
| 6,883,327 | B2 | * | 4/2005 | Iijima et al. ..................... 60/649 |
| 2011/0100008 | A1 | | 5/2011 | Beul |

FOREIGN PATENT DOCUMENTS

| | | |
|---|---|---|
| EP | 01164254 | 8/2003 |
| EP | 2136037 A2 | 12/2009 |
| EP | 2143891 A2 | 1/2010 |
| FR | 1350025 A | 1/1964 |
| JP | 61218707 A * | 9/1986 |

OTHER PUBLICATIONS

Search Report and Written Opinion from corresponding EP Application No. 11190666.5-2321 dated Mar. 15, 2012.

* cited by examiner

*Primary Examiner* — Christopher Jetton
(74) *Attorney, Agent, or Firm* — Cantor Colburn LLP

(57) ABSTRACT

A steam-driven power plant includes a steam source providing steam at a desired pressure and a steam turbine operably connected to the steam source. The steam turbine includes a low pressure section and an intermediate pressure section. A low pressure admission conduit is configured to convey steam from the steam source to an entrance of the low pressure section and an intermediate pressure admission conduit is configured to convey steam from the steam source to a mid-steampath point of the intermediate pressure section. One or more valves are located between the steam source and the steam turbine to control a flow of steam from the steam source through the low pressure admission conduit and/or the intermediate pressure admission conduit.

20 Claims, 3 Drawing Sheets

STEAM-DRIVEN POWER PLANT

BACKGROUND OF THE INVENTION

In a typical combined cycle power plant, hot exhaust gas from a gas turbine is introduced to a heat recovery steam generator (HRSG), to convert water to steam for admission into a steam turbine. The steam turbine includes a high pressure (HP) turbine section, an intermediate pressure (IP) turbine section and a low pressure (LP) turbine section. Steam is admitted into these turbine sections through admission pipes via one or more admission valves at the turbine sections. A minimum operating pressure of the HRSG, known as a floor pressure, is determined based on admission pipe size and desired HRSG cost considerations. During operation of the system, it is desired to maintain a pressure in the LP turbine section equal to or below LP admission pipe pressure. LP admission floor pressure in the HRSG is typically about 5% below LP pressure during full power operation. During full power operation, this is not problematic since the LP floor pressure is lower than pressure in the LP section. During part-power operations of the steam turbine, for example, 40% power, the LP section pressure lowers proportionally from the LP section pressure at full load. The HRSG, however, is still providing pressure to the LP admission valve at the LP floor pressure, which is greater than the part-power LP section pressure. In such situations, the LP admission valve must throttle the flow through the LP admission valve and LP admission pipe to be equal to or higher than the LP pressure. This throttling of the LP admission valve represents a performance loss to the HRSG and steam turbine system.

In a typical combined cycle power plant, hot exhaust gas from a gas turbine is introduced to a heat recovery steam generator (HRSG), to convert water to steam for admission into a steam turbine. The steam turbine includes a high pressure (HP) turbine section, an intermediate pressure (IP) turbine section and a low pressure (LP) turbine section. Steam is admitted into these turbine sections through admission pipes via one or more admission valves at the turbine sections. A minimum operating pressure of the HRSG, known as a floor pressure, is determined based on admission pipe size and desired HRSG cost considerations. During operation of the system, it is desired to maintain a pressure in the LP turbine section equal to or below LP admission pipe pressure. LP admission floor pressure in the HRSG is typically about 5% below LP pressure during full power operation. During full power operation, this is not problematic since the LP floor pressure is lower than pressure in the LP section. During part-power operations of the steam turbine, for example, 40% power, the LP section pressure lowers proportionally from the LP section pressure at full load. The HRSG, however, is still providing pressure to the LP admission valve at the LP floor pressure, which is greater than the part-power LP section pressure. In such situations, the LP admission valve must throttle the flow through the LP admission valve and LP admission pipe to be equal to or higher than the LP pressure. This throttling of the LP admission valve represents a performance loss to the HRSG and steam turbine system.

BRIEF DESCRIPTION OF THE INVENTION

According to one aspect of the invention, a steam-driven power plant includes a steam source providing steam at a desired pressure and a steam turbine operably connected to the steam source. The steam turbine includes a low pressure section and an intermediate pressure section. A low pressure admission conduit is configured to convey steam from the steam source to an entrance of the low pressure section and an intermediate pressure admission conduit is configured to convey steam from the steam source to a mid-steampath point of the intermediate pressure section. One or more valves are located between the steam source and the steam turbine to control a flow of steam from the steam source through the low pressure admission conduit and/or the intermediate pressure admission conduit.

According to another aspect of the invention, a combined cycle power plant includes a power generation apparatus and a heat recovery steam generator operably connected to the power generation apparatus such that heat exhaust from the power generation apparatus is input into the heat recovery steam generator. A steam turbine operably connected to the heat recovery steam generator and includes a low pressure section and an intermediate pressure section. A low pressure admission conduit is configured to convey steam from the heat recovery steam generator to an entrance of the low pressure section and an intermediate pressure admission conduit configured to convey steam from the heat recovery steam generator to a mid-steampath point of the intermediate pressure section. One or more valves are located between the heat recovery steam generator and the steam turbine to control a flow of steam from the heat recovery steam generator through the low pressure admission conduit and/or the intermediate pressure admission conduit.

According to yet another aspect of the invention, a method of admitting steam into a steam turbine includes providing steam at a steam source and conveying the steam through a steam conduit toward the steam turbine. The steam is routed through a low pressure admission conduit to an entrance of a low pressure section of the steam turbine and/or through an intermediate pressure steam conduit to a mid-steampath point of an intermediate pressure section of the steam turbine, depending on operating conditions of the steam turbine.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
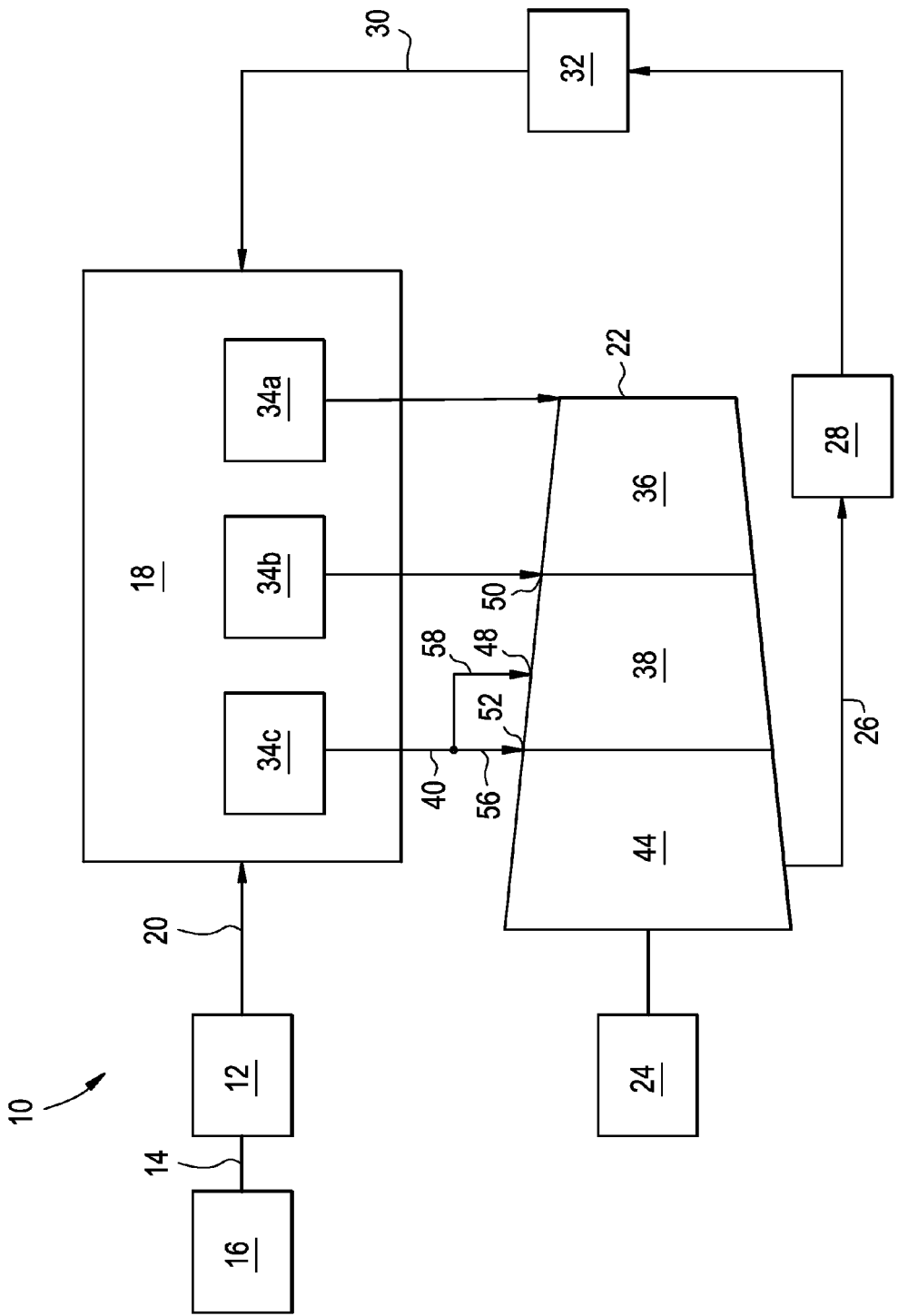
FIG. 1 is a schematic view of an embodiment of a combined cycle power plant.

Shown in FIG. 1 is a schematic of a combined cycle power plant 10. The combined cycle power plant 10 includes a gas turbine 12, or other power generation system such as a nuclear reactor. A mixture of fuel and air is combusted in the gas turbine 12 and drives rotation of a gas turbine shaft 14. The gas turbine shaft 14 is connected to a first generator 16 such that rotation of the gas turbine shaft 14 drives the first generator 16 thereby producing electrical power. Exhaust heat from the gas turbine 12 is introduced to a heat recovery steam generator (HRSG) 18 via stream 20. The HRSG 18 utilizes the exhaust heat to produce steam to drive a steam turbine 22. The steam turbine 22 is connected to a second generator 24 such that rotation of the steam turbine 22 drives the second generator 24 thereby producing electrical power.

More specifically, exhaust steam 26 from the steam turbine 22 is condensed in a condenser 28 and urged to the HRSG 18 via condensate conduit 30. In some embodiments, a pump 32 is provided to urge the condensate to the HRSG 18. The HRSG 18 produces steam in drums 34 corresponding to portions of the steam turbine 22. Steam is produced in a high pressure drum 34a and introduced to the steam turbine 22 at an entrance to a high pressure section 36 of the steam turbine 22. Similarly, steam is produced in an intermediate pressure drum 34b and introduced to the steam turbine 22 at an entrance to an intermediate pressure section 38. Finally, steam is generated in a low pressure drum 34c and introduced to the steam turbine 22. Introduction of the steam to the steam turbine 22 drives rotation of the steam turbine 22 thereby driving the second generator 24 to produce electrical power.

Figure 2:
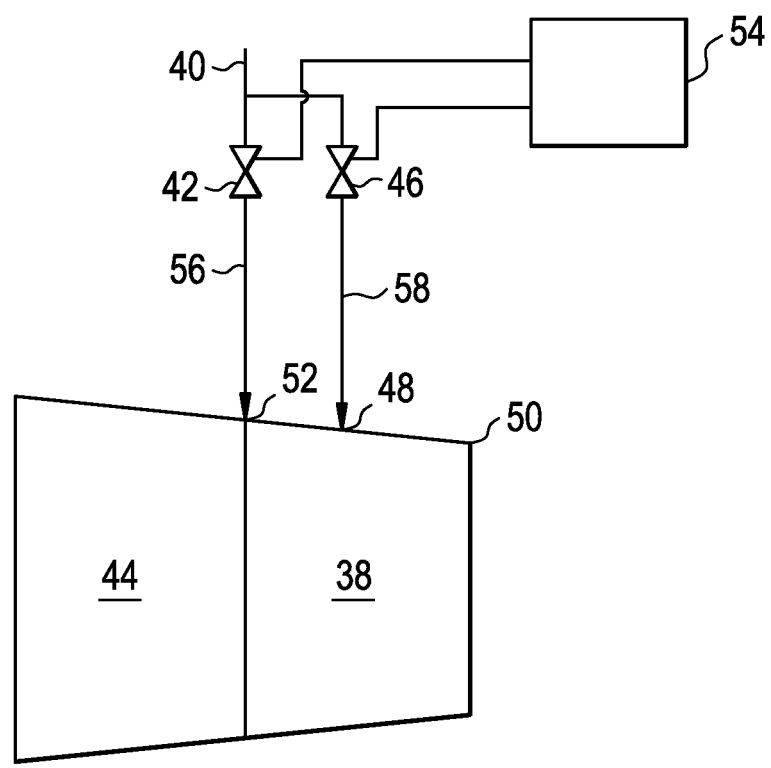
FIG. 2 is a partial schematic view of an embodiment of a combined cycle power plant.

Referring now to FIG. 2, steam is directed to the steam turbine 22 from the low pressure drum 34c via a steam conduit 40. The steam conduit 40 is connected to a low pressure admission valve 42 configured to introduce steam from the low steam conduit 40 at an entrance to a low pressure section 44 of the steam turbine 22 via a low pressure admission conduit 56. The steam conduit 40 is further connected to an intermediate pressure mid-steampath valve 46 configured to introduce steam from the steam conduit 40 into the intermediate pressure section 38 at a mid-steampath point 48 via an intermediate pressure admission conduit 58. The mid-steampath point 48 is located substantially between an intermediate pressure section entrance 50 and an intermediate pressure section exit 52. The low pressure admission valve 42 and the intermediate pressure mid-steampath valve 46 are connected to a controller 54 which opens and closes the low pressure admission valve 42 and the intermediate pressure mid-steampath valve 46 depending on operating conditions of the combined cycle power plant 10.

The steam is produced in the low pressure drum 34c, which in some embodiments is in the range of about 50-60 psia at full power. When the combined cycle power plant 10 is operating at or near full power, pressure in the low pressure section 44 is about at or above the floor pressure. In such operating conditions, the controller 54 opens the low pressure admission valve 42 and closes the intermediate pressure mid-steampath valve 46 thus directing steam from the low pressure drum 34c through the low pressure admission conduit 56 and into the steam turbine 22 at an entrance to the low pressure section 44.

On the other hand, when the combined cycle power plant 10 is operating at part power, for example, about 40% power, pressure in the low pressure section 44 is significantly lower than the floor pressure. For example, at 40% part power, the pressure in the low pressure section 44 may be about 29 psia, compared to a floor pressure of 50-60 psia. In these operating conditions, if steam is introduced to the entrance of the low pressure section 44 from the low pressure drum 34c, the low pressure admission valve 42 will need to be throttled to reduce the pressure of the steam introduced to the entrance of the low pressure section 44. Such throttling would result in losses to the system. To avoid the losses and produce additional work from the steam, the low pressure admission valve 42 is closed, and the intermediate pressure mid-steampath valve 46 is opened to introduce the steam from the low pressure drum 34c at the mid-steampath point 48 via the intermediate pressure admission conduit 58, where the pressure in the intermediate pressure section 38 is equal to or lower than the floor pressure. Admitting the steam from the low pressure drum 34c at a point upstream of the entrance to the low pressure section 44 allows additional work to be produced from the low pressure drum 34c steam, and prevents losses in the system thereby increasing efficiency of the combined cycle power plant 10.

In some embodiments, more than one intermediate pressure mid-steampath valve 46 may be provided, located at different points along the intermediate pressure section 38. When the combined cycle power plant 10 is under part power operating conditions, the controller selects the appropriate intermediate pressure mid-steampath valve 46 and admission conduit 58 based on the pressure at particular points in the intermediate pressure section 38 under the particular part power condition at which the combined cycle power plant 10 is operating. This allows for matching of the steam pressure to the intermediate pressure section 38 pressure, further reducing system losses.

Figure 3:
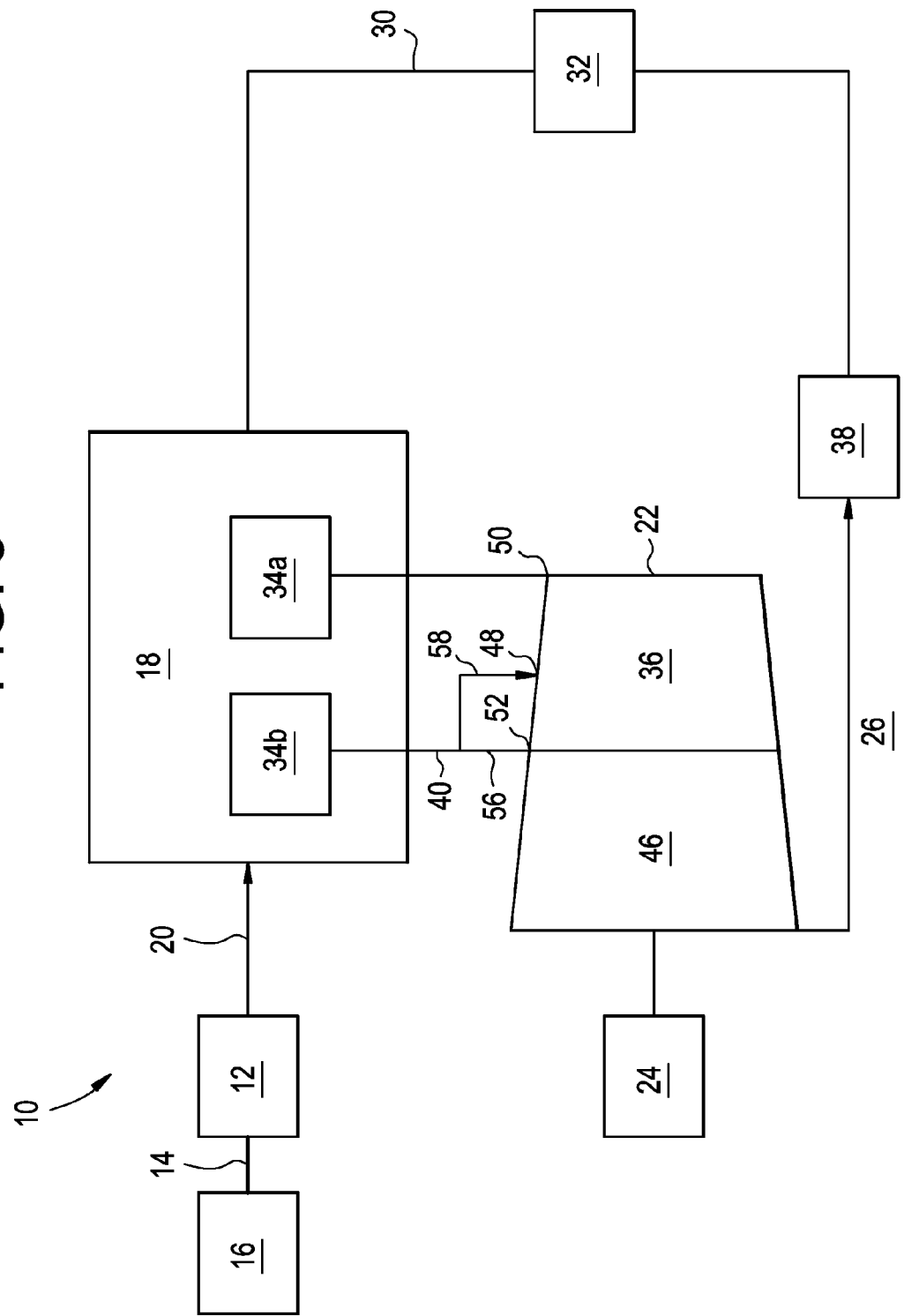
FIG. 3 is a schematic of another embodiment of a combined cycle power plant.

In some embodiments, as shown in FIG. 3, the steam turbine 22 includes the high pressure section 36 and low pressure section 44, and the intermediate pressure section is absent. In such embodiments, the mid-steampath point 48 is located at the high pressure section 36 and steam is admitted from the admission conduit 58 at the mid-steampath point 48 to reduce system losses.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A steam-driven power plant comprising:
    a steam source providing steam at a desired pressure;
    a steam turbine operably connected to the steam source including:
        a low pressure section; and
        an intermediate pressure section;
    a low pressure admission conduit to convey steam from the steam source to an entrance of the low pressure section;
    an intermediate pressure admission conduit extending from the low pressure admission conduit to divert at least a portion of the steam from the low pressure admission conduit to a mid-steampath point of the intermediate pressure section when an operating pressure in the low pressure section is lowered to below a floor pressure of the steam from the steam source; and
    one or more valves disposed between the steam source and the steam turbine to control a flow of steam from the steam source through the low pressure admission conduit and/or the intermediate pressure admission conduit.

2. The power plant of claim 1, wherein the one or more valves comprise:
    a low pressure admission valve disposed at the low pressure admission conduit; and
    an intermediate pressure valve disposed at the intermediate pressure admission conduit.

3. The power plant of claim 1, wherein the one or more valves is a three way valve connected to the low pressure admission conduit and the intermediate pressure admission conduit.

4. The power plant of claim 1, further comprising a controller operably connected to the one or more valves.

5. The power plant of claim 4, wherein the controller is configured to open and/or close the one or more valves depending on operating conditions of the power plant.

6. The power plant of claim 1, wherein the steam source is a heat recovery steam generator.

7. The power plant of claim 6, wherein the steam source is a low pressure drum of a heat recovery steam generator.

8. A power plant comprising:
   a power generator;
   a heat recovery steam generator operably connected to the power generator such that heat exhaust from the power generator is input into the heat recovery steam generator;
   a steam turbine operably connected to the heat recovery steam generator including:
      a low pressure section; and
      an intermediate pressure section;
   a low pressure admission conduit to convey steam from the heat recovery steam generator to an entrance of the low pressure section;
   an intermediate pressure admission conduit extending from the low pressure admission conduit to divert at least a portion of the steam from the low pressure admission conduit to a mid-steampath point of the intermediate pressure section when an operating pressure in the low pressure section is lowered to below a floor pressure of the steam from the steam source; and
   one or more valves disposed between the heat recovery steam generator and the steam turbine to control a flow of steam from the heat recovery steam generator through the low pressure admission conduit and/or the intermediate pressure admission conduit.

9. The power plant of claim 8, wherein the one or more valves comprise:
   a low pressure admission valve disposed at the low pressure admission conduit; and
   an intermediate pressure valve disposed at the intermediate pressure admission conduit.

10. The power plant of claim 8, wherein the one or more valves is a three way valve connected to the low pressure admission conduit and the intermediate pressure admission conduit.

11. The power plant of claim 8, further comprising a controller operably connected to the one or more valves.

12. The power plant of claim 11, wherein the controller is configured to open and/or close the one or more valves depending on operating conditions of the power plant.

13. The power plant of claim 8, wherein the steam source is a heat recovery steam generator.

14. The power plant of claim 13, wherein the steam source is a low pressure drum of a heat recovery steam generator.

15. The power plant of claim 8, wherein the power generator is a gas turbine.

16. A method of admitting steam into a steam turbine comprising:
   providing steam at a steam source;
   conveying the steam through a steam conduit toward the steam turbine; and
   routing the steam from the steam conduit through a low pressure admission conduit to an entrance of a low pressure section of the steam turbine; and
   diverting at least a portion of the steam through an intermediate pressure steam conduit to a mid-steampath point of an intermediate pressure section of the steam turbine when an operating pressure in the low pressure section is lowered to below a floor pressure of the steam from the steam source.

17. The method of claim 16, further comprising opening and/or closing one or more valves disposed at the steam conduit to direct the steam to the low pressure admission conduit and/or the intermediate pressure conduit.

18. The method of claim 16, wherein the operating conditions are a power operating level of the steam turbine.

19. The method of claim 18, wherein steam is directed through the low pressure admission conduit during full power operation of the steam turbine.

20. The method of claim 18, wherein steam is directed through the intermediate pressure steam conduit during part-power operation of the steam turbine.

* * * * *

UNITED STATES PATENT AND TRADEMARK OFFICE
CERTIFICATE OF CORRECTION

PATENT NO. : 8,776,523 B2
APPLICATION NO. : 12/957526
DATED : July 15, 2014
INVENTOR(S) : Mehra et al.

It is certified that error appears in the above-identified patent and that said Letters Patent is hereby corrected as shown below:

In the Specification

In Column 1, Line 5 below "BACKGROUND OF THE INVENTION", insert -- The subject matter disclosed herein relates to steam-driven power plants. More specifically, the subject disclosure relates to control of steam admission into a steam turbine of a combined cycle power plant --.

In Column 1, Lines 32-58, delete "In a typical combined cycle power plant, hot exhaust gas from a gas turbine is introduced to a heat recovery steam generator (HRSG), to convert water to steam for admission into a steam turbine. The steam turbine includes a high pressure (HP) turbine section, an intermediate pressure (IP) turbine section and a low pressure (LP) turbine section. Steam is admitted into these turbine sections through admission pipes via one or more admission valves at the turbine sections. A minimum operating pressure of the HRSG, known as a floor pressure, is determined based on admission pipe size and desired HRSG cost considerations. During operation of the system, it is desired to maintain a pressure in the LP turbine section equal to or below LP admission pipe pressure. LP admission floor pressure in the HRSG is typically about 5% below LP pressure during full power operation. During full power operation, this is not problematic since the LP floor pressure is lower than pressure in the LP section. During part-power operations of the steam turbine, for example, 40% power, the LP section pressure lowers proportionally from the LP section pressure at full load. The HRSG, however, is still providing pressure to the LP admission valve at the LP floor pressure, which is greater than the part-power LP section pressure. In such situations, the LP admission valve must throttle the flow through the LP admission valve and LP admission pipe to be equal to or higher than the LP pressure. This throttling of the LP admission valve represents a performance loss to the HRSG and steam turbine system.".

Signed and Sealed this
Second Day of June, 2015

Michelle K. Lee
*Director of the United States Patent and Trademark Office*